H. KITCHER.
WHEEL AND TIRE THEREFOR.
APPLICATION FILED FEB. 14, 1913.

1,088,905.

Patented Mar. 3, 1914.

WITNESSES

INVENTOR
H. KITCHER

UNITED STATES PATENT OFFICE.

HENRY KITCHER, OF TORONTO, ONTARIO, CANADA.

WHEEL AND TIRE THEREFOR.

1,088,905. Specification of Letters Patent. Patented Mar. 3, 1914.

Application filed February 14, 1913. Serial No. 748,393.

*To all whom it may concern:*

Be it known that I, HENRY KITCHER, of the city of Toronto, in the county of York, in the Province of Ontario, Canada, have invented certain new and useful Improvements in Wheels and Tires Therefor, of which the following is the specification.

My invention relates to improvements in wheels and tires therefor and the object of the invention is to devise a tire using the ordinary inner tube which will be non-puncturable and in which there will be no danger of bruising or pinching of the inner tube and in which all the moving parts will be rendered dust proof thereby minimizing the wear and it consists essentially of an annular casing forming the felly of the wheel having a center annular slot in its outer periphery, and an annular face slot in one side thereof and an annular plate secured within such face slot, an inner tube held within the annular casing, a series of sections arranged radially around the inner tube and having inner shoed ends bearing upon the outer periphery of the inner tube and outer enlarged ends, an outer casing clenched around the enlarged end of the sections and having web like portions extending down to each side thereof terminating in annular beads located to each side of the annular casing, means for detachably securing such beaded portions to the sides of the casing, a bearing bracket portion extending upwardly from the annular casing and against which the clenched portion of the tire is designed to bear when depressed to its limit and means for holding the sections circumferentially in place as hereinafter particularly explained by the following specification.

Figure 1:
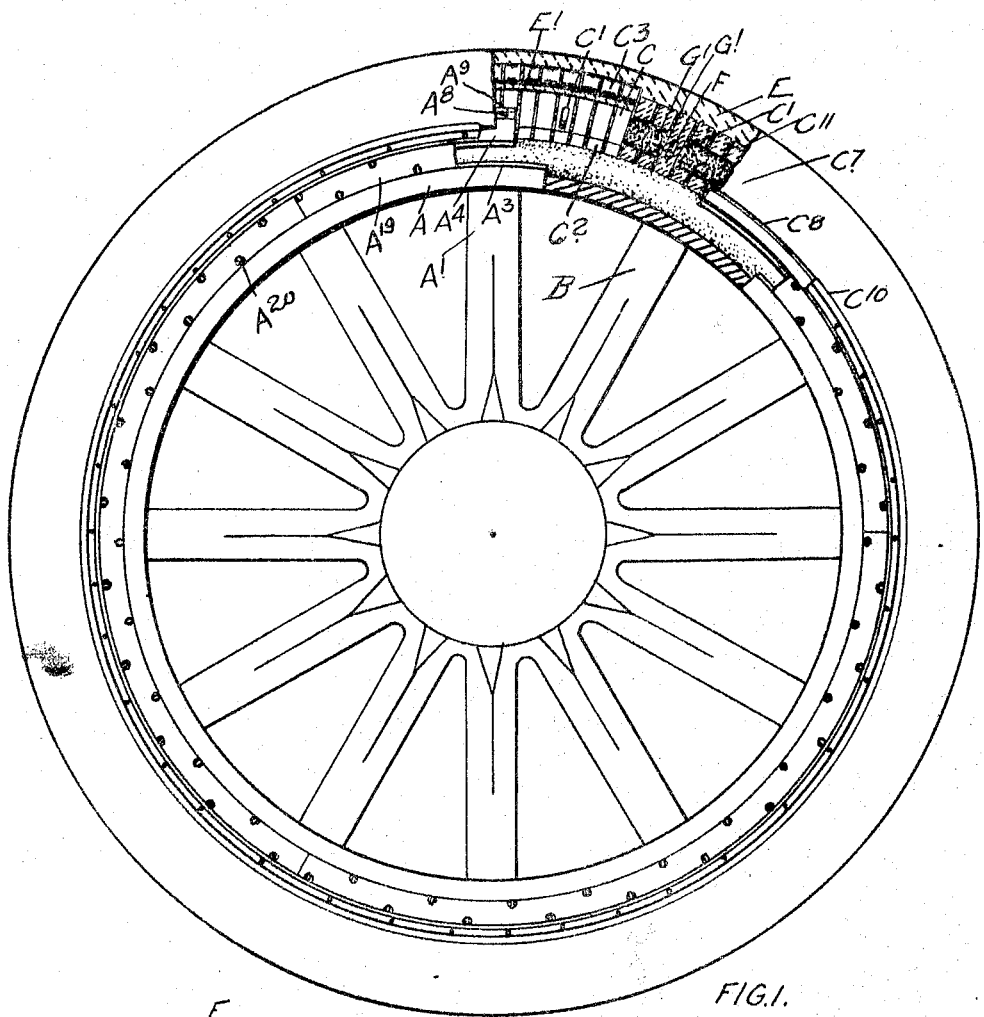
Figure 2:
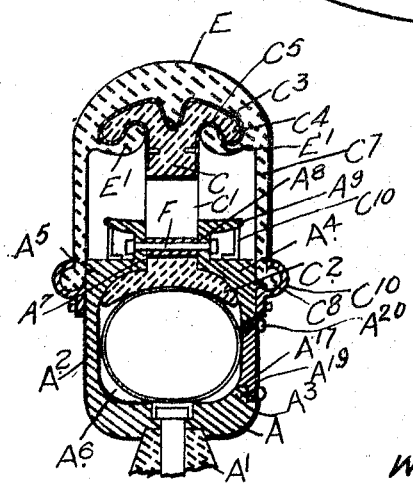
Figure 3:
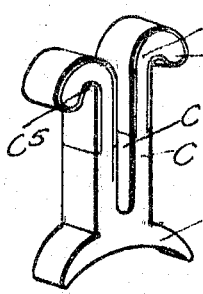
Figure 4:
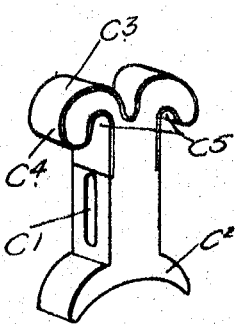

Figure 1, is a face elevation partially in section of an automobile wheel showing my tire attached thereto. Fig. 2, is an enlarged sectional view through the tire and felly. Figs. 3 and 4, are enlarged perspective details of the movable sections.

In the drawings like letters of reference indicate corresponding parts in each figure.

A is the felly of the wheel to which the spokes A' are connected in any suitable manner.

$A^2$ and $A^3$ are upwardly extending annular flanges located to each side of the felly having inturned upper ends $A^4$ and $A^5$ forming the casing $A^6$ having an annular slotted portion $A^7$ extending around the periphery thereof, and an open face slot $A^{17}$.

B is the inner tire located within the casing $A^6$ (see Fig. 2).

C are a series of radially arranged sections arranged circumferentially around the wheel, a suitable number of which are provided with radial slots C' for a purpose which will hereinafter appear, and the remaining sections with slot $C^{11}$ having open upper ends. The inner end of each section is provided with a shoe $C^2$ having a concaved inner face designed to bear against the outer periphery of the inner tube.

$C^3$ are wing like portions extending from the outer end of each section, such portions being enlarged toward their outer end $C^4$ forming an annular groove $C^5$ between such portions and the body of each section.

$A^8$ are annular flanges extending from the portions $A^4$ and $A^5$ and terminating in horizontal portions $A^9$. The distance between the outer surface of the portion $A^9$ and the portion $C^4$ is less than the radial diameter of the inner tube.

E is the outer tire casing provided with clenched portions E' extending around the enlarged portions $C^4$ so as to fit in the curve $C^5$ to hold the casing in place.

$C^7$ are webs extending inwardly from each side of the casing E and terminating in annular beads $C^8$.

$C^{10}$ are securing brackets secured to the annular casing and extending around the beaded portions $C^8$ of the outer casing thereby securing the outer casing E to the casing $A^6$.

F are cross bolts extending through the flanges $A^8$ and slots C'. By this means the sections are held circumferentially in place.

G are strips of flexible and resilient material extending through the slots $C^{11}$ and having projections G' extending between each of the sections C above and below the strip G thereby holding the sections normally apart and allowing the sections to draw slightly together, when they are depressed radially inwardly as the wheel travels over the surface of the ground. These strips extend between each adjacent pair of sections having the slot C' therein.

It will thus be seen from this description that as the wheel revolves the outer casing will be depressed depressing the sections radially inwardly upon the inner tube, such motion being limited by the clenched portions E' coming in contact with the bearing portions $A^9$ and thus preventing such sections being depressed to such an extent as to pinch the inner tube and bruise it. It will also be seen in forming the webs $C^7$ on the outer casing and connecting them to the annular casing $A^6$ that dust is absolutely prevented from entering such casing and collecting between the moving parts and thus increasing the friction between such moving parts. It will also be seen such construction of the tube will be rendered non-puncturable and strong and durable.

$A^{19}$ is a closing plate formed in sections and secured by bolts $A^{20}$ to the flange $A^3$ at each side of the opening $A^{17}$. By this means the inner tube may be easily removed when desired.

What I claim as my invention is—

1. In a wheel and tire therefor, the combination with an annular casing comprising a felly having an annular slot in its periphery, of a pneumatic tube held within the casing, bearing brackets extending upwardly from the annular casing to each side of the annular slot, radially depressible sections having enlarged inner ends bearing upon the inner tire and having enlarged outer ends, an outer casing or tire secured to the enlarged outer ends of the sections and having inwardly curved web-like portions at each side thereof engaging beneath said enlarged ends and terminating in beaded portions and brackets secured to the annular casing or felly and extending around such beaded portions, as and for the purpose specified.

2. In a wheel and tire therefor, the combination with an annular casing forming the felly having a peripheral slot formed therein, of a pneumatic tube held within the casing, depressible sections held within the peripheral slot and having enlarged inner ends bearing upon the pneumatic tube, and an enlarged outer end, a tire secured on such enlarged outer ends, certain of said depressible sections being provided with open ended slots, strips of flexible resilient material extending through the slots and having projections extending between each of said last mentioned sections above and below said strips thereby holding the sections normally apart and allowing the sections to draw together tightly.

HENRY KITCHER.

Witnesses:
B. BOYD,
W. BOND.